United States Patent [19]

Gage

[11] Patent Number: 4,625,751

[45] Date of Patent: Dec. 2, 1986

[54] VEHICLE STEERING AND AUXILIARY FUNCTION HYDRAULIC CIRCUIT

[75] Inventor: Douglas M. Gage, Dubuque, Iowa

[73] Assignee: Deere & Company, Moline, Ill.

[21] Appl. No.: 708,915

[22] Filed: Mar. 6, 1985

[51] Int. Cl.$^4$ ............................................. G05D 7/01
[52] U.S. Cl. .................................... 137/118; 137/554; 200/81.9 R; 200/82 R
[58] Field of Search ...................... 137/101, 118, 554; 60/422; 200/81.9 R, 82 R, 83 N

[56] References Cited

U.S. PATENT DOCUMENTS

| | | | |
|---|---|---|---|
| 2,747,042 | 5/1956 | Zimmerman | 200/81.9 R |
| 3,119,990 | 1/1964 | Warth | 200/82 R |
| 3,872,885 | 3/1975 | Eloi et al. | 137/554 |
| 3,884,262 | 5/1975 | Assembergs | 137/489 |
| 3,890,995 | 6/1975 | Miller et al. | 137/554 |
| 4,034,563 | 7/1977 | Orth | 60/422 |
| 4,192,337 | 3/1980 | Alderson et al. | 137/101 |
| 4,213,300 | 7/1980 | Biskis | 60/422 X |
| 4,303,089 | 12/1981 | Gage et al. | 137/554 X |
| 4,326,558 | 4/1982 | Gage | 137/554 |
| 4,337,620 | 7/1982 | Johnson | 137/101 X |

Primary Examiner—Martin P. Schwadron
Assistant Examiner—Stephen M. Hepperle

[57] ABSTRACT

A hydraulic circuit includes as its major constituents a pump supplying hydraulic fluid to a main steering valve and to an auxiliary function valve through a priority valve. The priority valve allows the main steering valve to preempt the auxiliary function valve on demand. A secondary valve is provided to allow an accumulator to discharge hydraulic fluid to the main steering valve should the hydraulic circuit experience a loss of pressure and flow. Electrical circuit means are provided to warn the operator that the hydraulic circuit has lost pressure and flow.

2 Claims, 4 Drawing Figures

VEHICLE STEERING AND AUXILIARY FUNCTION HYDRAULIC CIRCUIT

BACKGROUND OF THE INVENTION

The present invention relates to the hydraulic circuit for providing fluid to a vehicle's steering and auxiliary functions and, more particularly, relates to such hydraulic circuits giving steering priority over auxiliary functions and having an accumulator for providing emergency steering capability.

Industrial vehicles such as skidders, loaders and scrapers, or the like, are provided with hydraulically fed steering systems which make it possible for large vehicles to be maneuvered with relative ease during all operations. Such vehicles are also provided with hydraulically fed auxiliary function capabilities to operate such things as grapples, loader buckets and scraper blades. The auxiliary functions share hydraulic fluid with the steering system. Conventionally, hydraulic fluid is passed through a priority valve which branches fluid to both the steering system and the auxiliary functions giving priority to the steering system. That is, the fluid requirements of the steering system have preemption over the fluid requirements of the auxiliary function. Emergency steering capability is provided by an accumulator which is in fluid communication with a secondary valve which ports accumulator contained fluid to the steering system upon sensing the last of a substantial degree of fluid fed pressure to the steering system.

Conventionally, the priority valve includes a valve spool acted upon by fluid pressure to overcome a spring and assume a first spool position. The first position allows the priority valve to port fluid to both the main steering valve of the steering system and to the auxiliary functions. When the fluid pressure drops below a predetermined amount occasioned by a fluctuation in hydraulic circuit pressure, the spring force on the valve spool shifts the valve spool to a second position porting all incoming fluid to the main steering valve.

Large vehicles utilize steering systems which require relatively high fluid pressure on the order of 1500 to 2000 psi, in contrast, the fluid pressure requirements of auxiliary functions can be only a few hundred psi under certain conditions. As a result, when the vehicle is using an auxiliary function and is not being steered, the conventional priority valve, which is pressure sensitive, experiences high pressures necessary to overcome the spring force on the valve spool. The absence of the production of work in light of high spool valve pressures results in the production of excessive heat necessitating the inclusion of a heat exchanger in the hydraulic circuit.

SUMMARY OF THE INVENTION

It is an objective of the present invention to present a hydraulic circuit for providing hydraulic fluid to a vehicle steering system and auxiliary functions which does not generate excessive heat during any particular mode of operation and, thereby, eliminating the need for a heat exchanger in the hydraulic circuit.

It is a further objective of the present invention to present a priority valve which is flow sensitive within the hydraulic circuit.

It is a still further objective of the present invention to present a means of alerting a vehicle operator to the loss of primary hydraulic pressure and flow within the hydraulic circuit. Additional objectives and benefits of the present invention will be noted in the subsequent detailed description.

The primary constituents of the hydraulic circuit are a pump, a priority valve, a secondary valve and a main steering valve. The pump supplies hydraulic fluid to a priority valve which is flow sensitive. In a normal mode, fluid passes through the priority valve and is delivered to the main steering valve and to non-priority auxiliary functions. Fluid is returned from the steering valve to the priority valve through a load sensing conduit. The secondary valve receives fluid from the pump to charge an accumulator. When the accumulator is charged, the secondary valve blocks flow from the accumulator to the main steering valve. An electrical circuit is provided for delivering a warning signal to the vehicle operator should flow in the priority valve and pressure in the secondary valve be reduced below a predetermined amount.

The priority valve includes a valve spool biased in a first position by fluid pressure within the hydraulic circuit feeding fluid the main steering valve and auxiliary functions, overcoming a spring force and additive fluid pressure delivered from the steering system through a load sensing conduit. A switch is provided in the priority valve. The switch contains a pin encountered perpendicularly by the priority valve spool when the valve spool is in a second position resulting from steering preemption occasioned by a substantial fluctuation or decrease in the primary hydraulic pressure. The switch in the priority valve acts thereupon in conjunction with a switch in the secondary valve to permit an electric circuit to energize an operator warning device. The collective effect of the switches prevent the electric circuit from sending false alerts to the operator during minor fluctuations of hydraulic pressure.

DESCRIPTION OF THE PREFERRED EMBODIMENT

Figure 1:
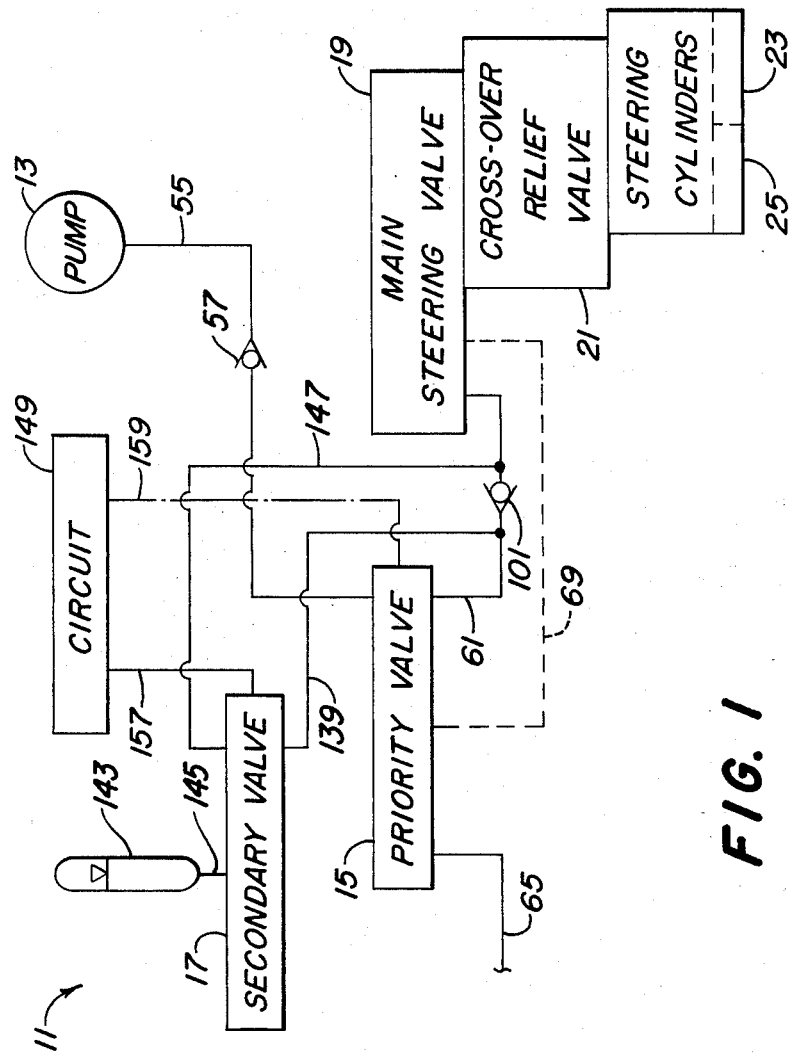
FIG. 1 is a schematic of a hydraulic circuit for supplying fluid to a vehicle steering system and auxiliary function in accordance with the present invention.

Referring to FIG. 1, a hydraulic circuit, generally indicated as 11, includes as primary constituents a pump 13, a priority valve 15, a secondary valve 17, and a substantially conventional main steering valve 19 more commonly employed to provide steering for off-road vehicles. In normal operation, the pump 13 provides hydraulic fluid to the priority valve 15 which is responsible for porting fluid to non-priority auxiliary functions and to priority functions, e.g., the main steering valve 19. The main steering valve 19 communicates with a crossover relief valve 21 and therethrough a right- and a left-hand steering cylinders 23 and 25, respectively, in a generally conventional manner. It is noted that it is within the contemplation of the invention that a plurality of priority functions, singularly represented herein by the main steering valve 19, may be associated with the hydraulic circuit 11. It is noted that the connotation of right and left are employed for ease of description and are referenced from a direct viewing of the drawings.

Figure 2:
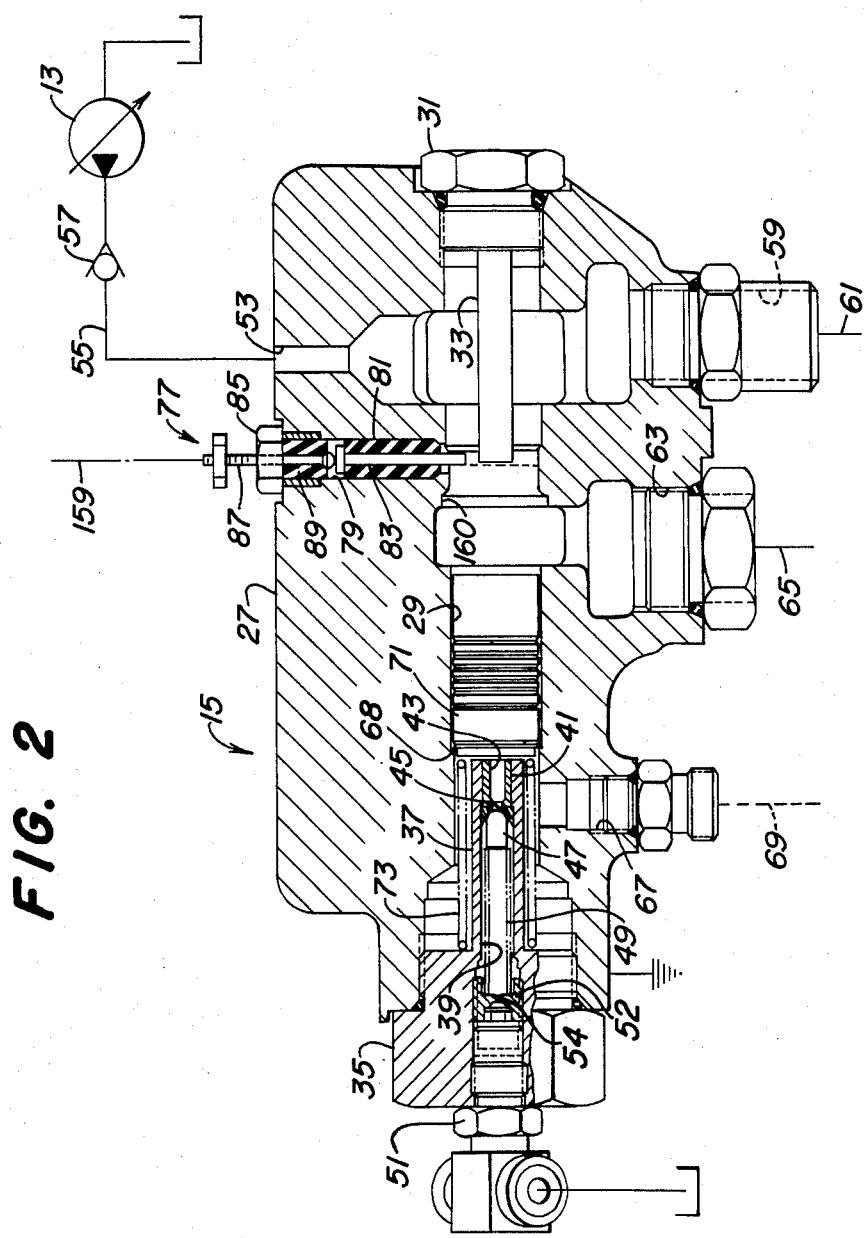
FIG. 2 is a sectioned view of a priority valve in accordance with the present invention.

Referring now to FIG. 2, the priority valve 15 includes a valve body 27 defining a valve bore 29. A threaded first plug 31 is threadably mounted in the right-hand end of valve bore 29. A rod 33 is fixably mounted by any conventional means centrally to the plug 31 and extends into valve bore 29. A second threaded plug 35 is threadably mounted to the left-hand end of valve bore 29. The plug 35 includes a formed tubular extension 37 centrally located extending through the plug 35 and into valve bore 29. The tubular extension 37 defines a passageway 39. Fixably mounted by any conventional means such as by press fitting within the right-hand end of passageway 39 is a plug 41. Plug 41 defines a longitudinal passageway 43. Within the tubular extension 37 is a poppet 47 biased into a seat member 45 by a compression spring 49. A drain plug 51 is fixably mounted by any conventional means within the left-hand portion of the tubular extension 37 of plug 35. A cylindrical member 52 is seated within passageway 39 of plug 35 between left-hand end of drain plug 51 and the right-hand end of spring 49. The member 52 contains an axial orifice 54.

The valve body 27 also defines a plurality of ports intersecting to the valve bore 29 which will be subsequently described generally from the right-hand side to the left-hand side. An inlet port 53 receives fluid from pump 13 through conduit 55. A check valve 57 interrupts conduit 55 to prevent conduit back flow. Generally located opposite to inlet port 53 is a priority function outlet port 59 (hereinafter called steering outlet port 59) which is in communication with the main steering valve 19 through conduit 61. Non-priority functions are supplied fluid from the priority valve 15 through a non-priority function outlet port 63 by conduit 65 which communicates in a conventional manner with a non-priority function valve (not shown). A priority load sensing port 67 is in communication with the main steering valve 19 through a load sensing conduit 69. Biased by inlet fluid pressure to the left-hand side within bore 29 against an annular step 68 in bore 29 is a valve spool 71. A compression spring 73 having a relatively low spring rate is abutting to a valve spool 71 on the left-hand side. The valve spool 71 is slidably mounted in bore 29. The compression spring 73 is abutting to the plug 35 at the other end, and is located around the tubular extension 37. Port 67 is located leftwardly of the valve spool's 71 leftward-most position. The valve spool 71 occupies either a first position which is against step 68 just opposite tubular extension 37 or (as shown in FIG. 2) a second position abutting to the left-hand end of rod 33 (as shown in phantom in FIG. 2). The relief valve 51 provides a means of relieving fluid pressure to the left-hand side of valve spool 71.

It is noted that the valve bore 29 includes a circumferential step 160 located just rightwardly of non-priority outlet port 63. It has been found that the inclusion of step 160 promotes flow through the priority valve to the non-priority outlet port 63. Step 160 alters the velocity profile of fluid as it passes initially over the region of step 160.

An electrical switch 77 is fixably mounted in an additional port 79 in the priority valve 15. The electrical switch 77 includes an insulator 81 which in the preferred embodiment is an elastomer having a pin 83 fixably mounted by any conventional means such as by press fitting therein and extending centrally through the insulator 81. In the preferred embodiment, the insulator 81 is pressed mounted in the port 79 such that pin 83 extends into valve bore 29 slightly leftward of the leftwardmost extension of pin 33. A plug 85 has a screw 87 extending therethrough, wherein screw 87 is insulated by insulation material 89 within the plug 85. The plug 85 is fixably mounted within port 79 such that one end of screw 87 is in contact with an opposite end of pin 83.

The pin 83 of switch 77 is set at a right angle to the valve spool 71 such that perpendicular contact of the valve spool 71 to pin 83 closes switch 77. The right angle alignment of pin 83 to valve spool 71 causes the pin 83 to experience slight angular deflection upon contact by valve spool 71. By so aligning pin 83 to valve spool 71 contact can be maintained between pin 83 and screw 87 when the valve spool 71 is in the second position. Further, because the elastomer insulator 81 receives the resulting loads from spool 71 on pin 83, the integrity of switch 77 is substantially prolonged.

Figure 3:
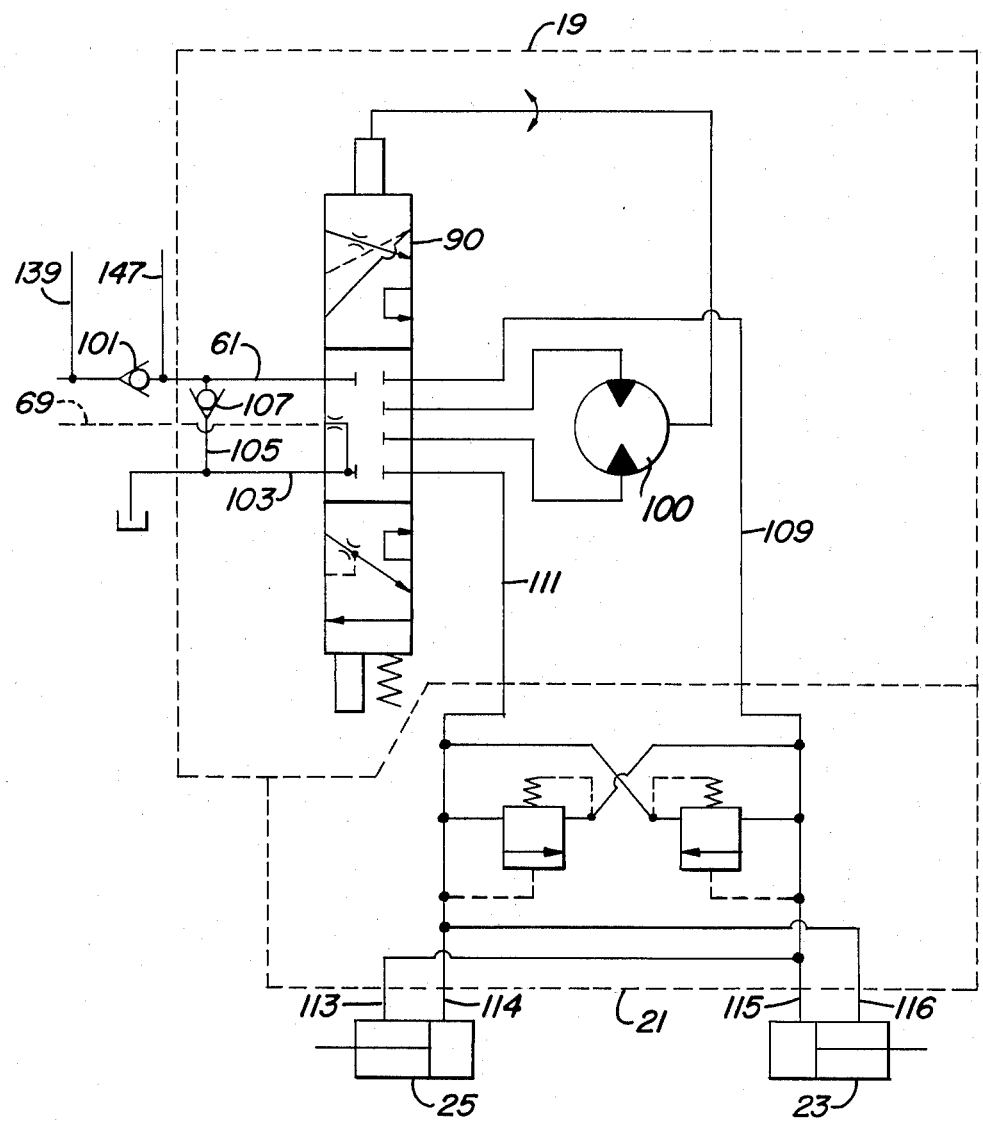
FIG. 3 is a schematic view of a main steering valve in accordance with the present invention.

Referring now to FIG. 3, the main steering valve 19 is of generally conventional design and includes a directional control valve 90 in communication with the priority valve 15 through conduit 61. A check valve 101 interrupts conduit 61 to require single directional fluid in conduit 61. A conduit 103 communicates the directional control valve 90 to sump. Downstream of check valve 101 is a conduit 105 communicating conduit 61 to conduit 103. A check valve 107 interrupting conduit 105 limiting the fluid flow direction from conduit 103 to conduit 61. The directional control valve 90 is further in communication with the load sensing conduit 69. The main steering valve 19 communicates with the load sensing conduit 69. The main steering valve 19 also communicates with the cross-over relief valve 21 through conduits 109 and 111 and the gerotor set 100 in a generally conventional manner, further communicating with the right- and left-hand steering cylinders 23 and 25, respectively, through conduits 113 to 116, respectively, in a conventional manner. The operation of the main steering valve 19, cross-over relief valve 21, and steering cylinders 23 and 25 is thought to be well understood by those skilled in the art.

Figure 4:
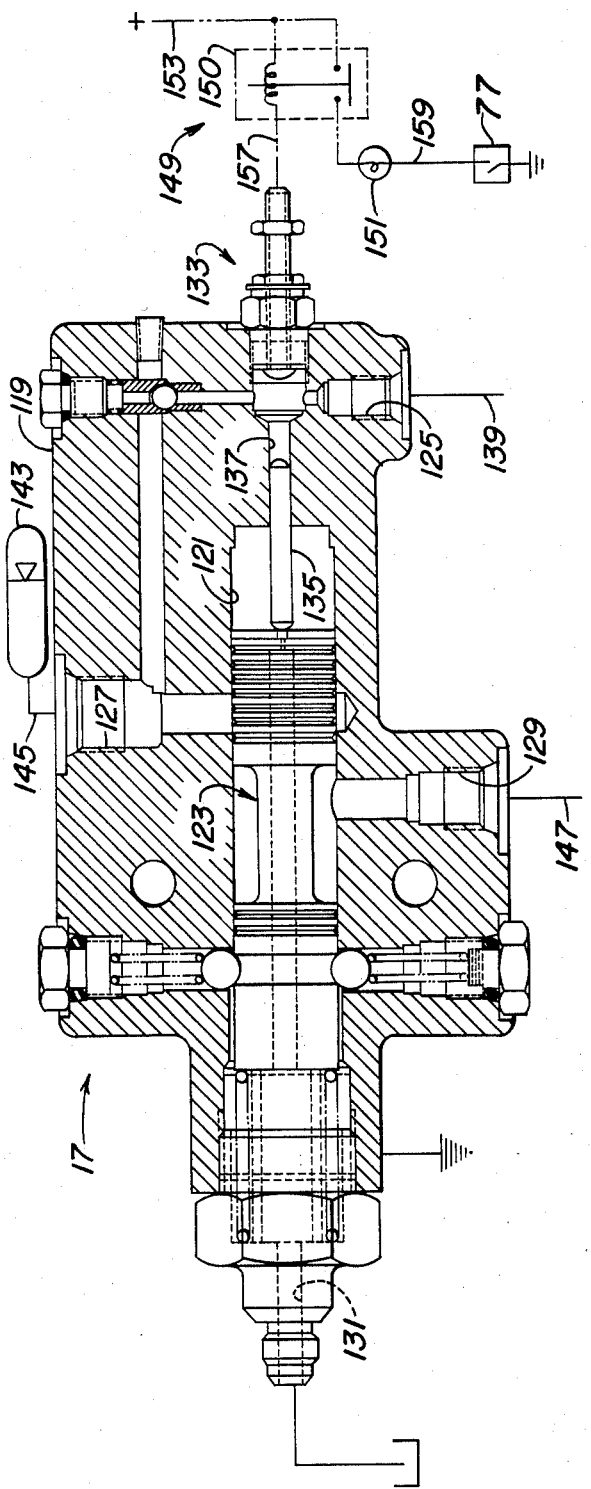
FIG. 4 is a sectioned view of a secondary valve and a schematic of an electrical circuit in accordance with the present invention.

Referring now to FIG. 4, the secondary valve 17 includes a valve body 119 defining a valve bore 121 having a spool 123 slidably contained therein. A plurality of ports are contained in the secondary valve 17 which communicate with valve bore 121, namely, an inlet port 125, a charge-discharge port 127, outlet port 129, and sump port 131. The secondary valve 17 also contains a switch 133 activated by a pin 135 slidably mounted in an axial bore 137. The secondary valve 17 is more particularly described in U.S. Pat. No. 4,326,558 issued to Douglas M. Gage on Apr. 27, 1982 and filed Nov. 24, 1980, herein incorporated by reference. Conduit 139 communicates inlet port 125 to conduit 61 upstream of check valve 101. A conventional accumulator 143 is in communication with the charge-discharge port 125 through a conduit 145. A conduit 147 communicates the outlet port 129 to conduit 61 downstream of check valve 101.

A warning circuit, generally indicated as 149, is provided, and includes a relay 150 and audible warning device 151. The warning circuit 149 receives a positive potential through line 153. An intersecting line 157 to line 153 delivers electrical potential to the relay 150 such that current flow through the relay 150 to line 157 causes the relay 150 to close. When the relay 150 is closed, current is permitted to flow between lines 153 and 159 actuating alarm 151. Line 157 communicates with switch 133 associated with the secondary valve 17 and permits current to flow therethrough when switch 133 is closed by valve spool 123. Line 159 communicates with switch 77 associated with the priority valve 15 and permits current to flow therethrough when switch 77 is closed. As a result, the operator is saved from the activation of the warning device 151 due to momentary fluctuation in hydraulic circuit pressure since it is necessary for the secondary valve switch 131 to be closed prior to alarm 151 activation.

There are three modes of operation for the hydraulic circuit 11. The first mode of operation is occasioned when the carrying vehicle is being steered and simultaneously operating an auxiliary function (as shown in the FIGS.). Under such operating conditions, the secondary valve stands with the charge-discharge port blocked by spool 123 prohibiting discharge of the accumulator and the switch 133 "OFF". The priority valve 15 stands with the spool 71 in the furthermost left-hand position allowing fluid received in inlet port 53 through conduit 55 from pump 13 to be directed to both the steering outlet port 59 and the non-priority function port 63. The second mode of operation is occasioned when the vehicle is not being steered and an auxiliary function(s) may or may not be in operation. Under such operating conditions, the secondary valve remains in the previously described state. However, there is no fluid pressure in the load sensing conduit 69 resulting in a reduced counter load on the priority valve spool 71 resulting in a highly significant reduction in heat generation in this operating mode as compared to the heat generated by a conventional priority valve used in similar circumstances. Under this condition, switch 75 is open and the emergency steering is not activated.

In the emergency mode resulting from the loss of hydraulic pressure, the absence of fluid flow through the priority valve 15 permits the spring 73 to cause the spool 71 to displace to the right coming into contact with pin 83 grounding switch 75 "ON". Further, spool 123 of the secondary valve 17 is displaced as a result of the loss of fluid pressure allowing the accumulator 143 to discharge. The displacement of spool 123, further, grounding switch 133 "ON". When switch 133 is grounded, current is allowed to flow from line 153 to line 157 actuating relay 150; the contemporaneous grounding of switch 75 allows current to flow from line 155 to line 159 through relay 150 to activate the warning device 151. The discharge of the accumulator is directed to the main steering valve through the conduit 147.

I claim:

1. A priority valve for inclusion in a hydraulic circuit, said priority valve for branching fluid delivered by said hydraulic circuit to said priority valve to priority users and non-priority users, said priority valve:
   a valve body defining a valve bore, a valve spool slidably mounted in said valve bore, and a plurality of port intersecting to said valve bore being specifically an inlet port, a priority user outlet port, a non-priority user outlet port and a priority load sensing port, first means for restricting motion of said valve spool to a first position allowing fluid communication between said inlet port and said priority user outlet port and also said non-priority user outlet port, and second means for restricting motion of said valve spool to a second position allowing fluid communication between said inlet port and said priority user outlet port; and
   a load sensing conduit fluidly communicates with said priority users and said priority user load sensing port to provide an additional source of fluid to said priority valve only when said valve spool occupies said second position, said additional fluid to act collectively with said first means, wherein the improvement comprises:
   said valve body further having a switch port intersecting to said valve bore;
   a switch having an insulating material generally cylindrically and radially mating sized to be longitudinally press mounted in said switch port a pin extending generally centrally through said insulating material to have one intrude into said valve bore at a right angle and to contact said valve spool at said angle when said spool occupies said second position, a plug fixably mounted to said valve body;
   a screw extending into said plug having one end in abutting contact with the other end of said pin, the other end of said screw extending beyond said valve body;
   a second insulating material sandwiched between said plug and a portion off said screw to fixably maintain said screw insulated from said valve body; and,
   electric circuit means for providing an audible warning when said pin is in contact with said valve spool, said electrical circuit means being in electrical communication with said electrical switch.

2. A priority as claimed in claim 1 wherein said first means comprises:
   a plug having tubular extension extending into said valve bore, said plug being fixably mounted to said valve body, a compression spring placed in said valve bore abutting to said plug at one end and to said valve spool at the other end;
   said priority load sensing port located projectionally intersecting to said tubular extension;
   a relief valve fixably mounted in said plug coaxially to said tubular extension a second plug having a passageway extending therethrough and fixably mounted in said tubular extension, said second plug having formed therein around one end of said passageway a seat;
   a poppet slidably supported in said tubular extension and being mating to said seat; and,
   a compression spring abutting to said relief valve at one end and to said poppet at the other end.

* * * * *